Oct. 13, 1931.  R. JARDINE  1,827,699
DUAL EXHAUST PORT AND VALVE COOLING ARRANGEMENT
Filed June 26, 1930   2 Sheets-Sheet 1
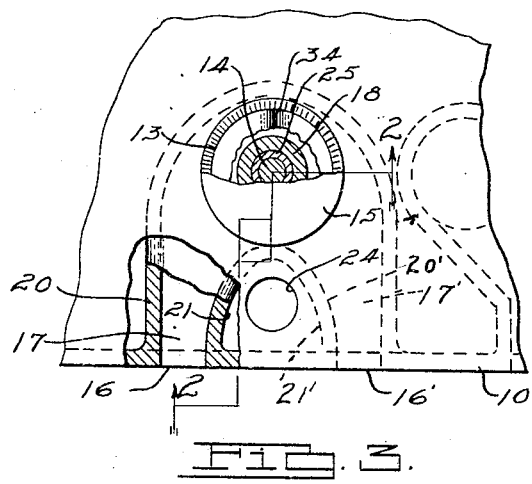
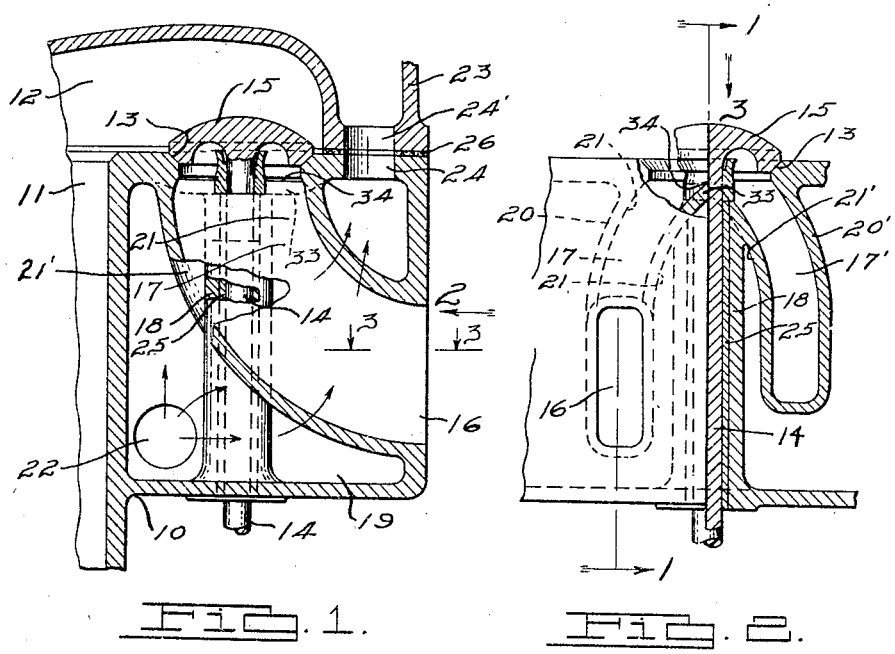
INVENTOR
Robert Jardine
BY
ATTORNEY

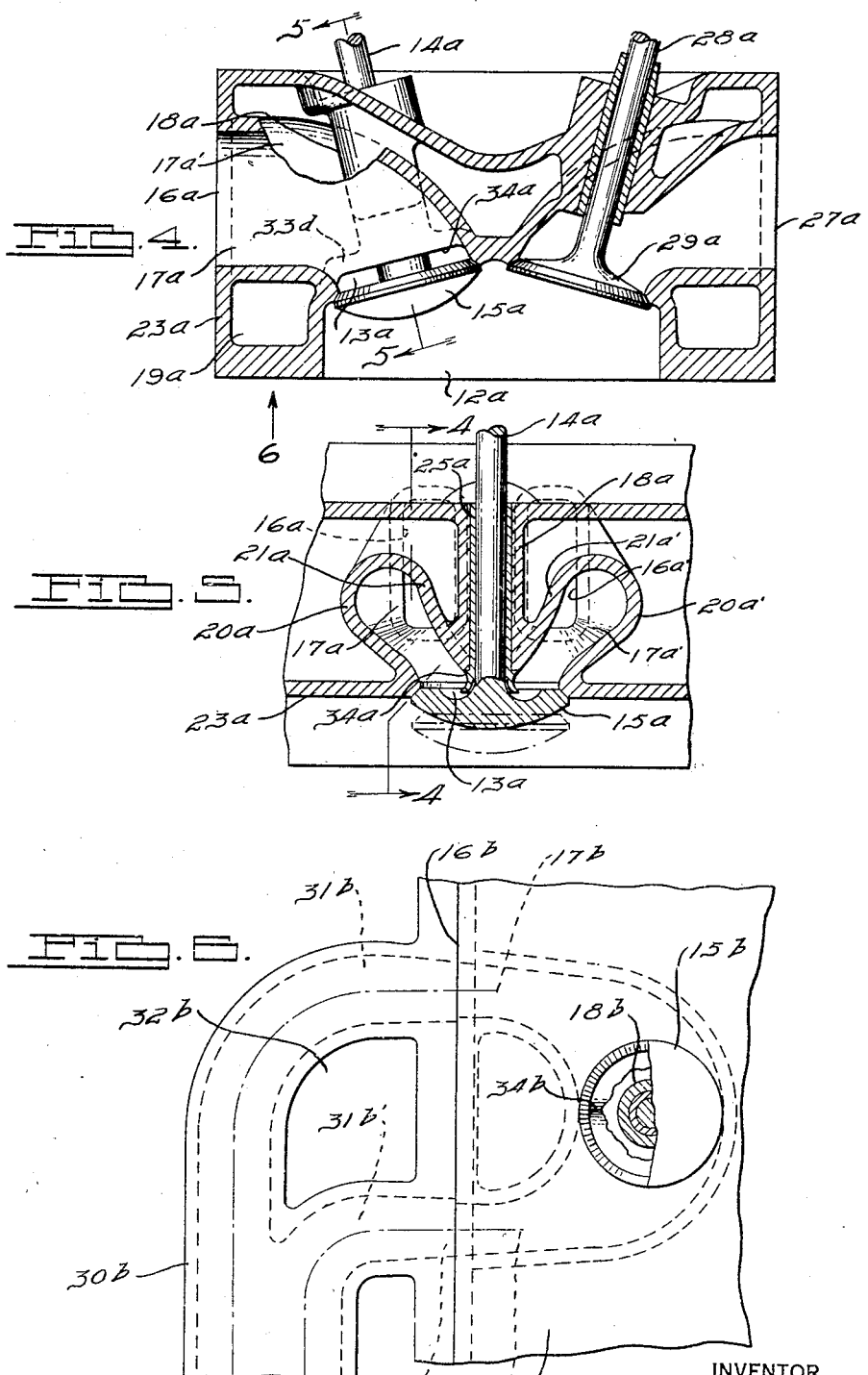

Patented Oct. 13, 1931

1,827,699

UNITED STATES PATENT OFFICE

ROBERT JARDINE, OF DETROIT, MICHIGAN, ASSIGNOR TO WILCOX-RICH CORPORATION, A CORPORATION OF MICHIGAN

DUAL EXHAUST PORT AND VALVE COOLING ARRANGEMENT

Application filed June 26, 1930. Serial No. 464,042.

As may be inferred from the above title, the object of this invention is to provide a construction admitting abundant cooling water to the stems or to the stem guides of poppet valves controlling exhaust ports from engines; and preferred embodiments of the present invention involve the use of a plurality of oppositely curved exhaust passages divergent from a valve seat opening and spaced from a substantially cylindrical stem guide throughout approximately the entire length thereof.

The Patent No. 1,735,865 granted to the present applicant on November 19, 1929, discloses and claims a construction tending in the general direction of the present invention in that a valve stem guide is exposed to cooling water on two sides thereof throughout substantially the entire length of said guide; but the mentioned patent construction, although serving a useful purpose as compared with the prior art, suffers the disadvantage that the inner wall of an auxiliary jacket is identical with the outer wall of the valve guide throughout an extended portion thereof,—less than half the length of said guide being completely cylindrical and surrounded on all sides by cooling water; and it is an object of the present invention, which may be referred to as a development from the device of the mentioned patent, not only to increase the area of exposure of valve guides, used in conjunction with exhaust ports, to cooling water but to obviate such distortion of said guides as has resulted from a lack of symmetry in the configuration of parts associated therewith and from a consequent inequality in the expansion effect resulting from conduction of heat thereto and therefrom.

Broadly, it is an object of the present invention to maintain a valve stem guide in accurate alignment or concentric relationship with a valve seat by protecting substantially the entire length of the valve stem guide from direct contact with exhaust gases and/or from direct contact with walls exposed to such gases. This not only obviates risk that the valve will imperfectly engage its seat but also minimizes the expansion of the valve stem and reduces the clearance required with the tappet,—the result being an increased efficiency and reliability of action at all temperatures and under all conditions of operation; and preferred embodiments of the invention may include not only valve stem guides that are symmetrical with reference to two axial planes and are exposed throughout practically the entire length thereof to cooling water, exhaust gases being delivered through a pair of passages divergent from an opening which provides a valve seat and spaced from said valve stem guide, but also special features of cooperating manifold construction, as hereinafter described.

Other objects of the present invention, applicable either to upwardly opening valves provided in cylinder blocks or to downwardly opening valves provided in head blocks or elsewhere (both the inner and the outer walls of initially divergent passages being exposed to the cooling water substantially throughout the length thereof and said passages being either convergent or divergent or substantially parallel in the region of their separate communication with an exhaust manifold) may be best appreciated from the following description of illustrative embodiments thereof, taken in connection with the appended claims and the accompanying drawings.

Fig. 1 is a fragmentary vertical sectional view through an engine block provided with one embodiment of the present invention, parts being broken away more deeply than is indicated by the line 1—1 of Fig. 2.

Fig. 2 is a fragmentary elevational view, taken substantially as indicated by the arrow 2 of Fig. 1, but with parts broken away somewhat as indicated by a line 2—2 of Fig. 3.

Fig. 3 is a partial plan view, taken substantially as indicated by the arrow 3 of Fig. 2, but with parts broken away to substantially the level indicated by the line 3—3 of Fig. 1.

Fig. 4 is a sectional view comparable with Fig. 1, but showing the invention as applied to a valve-in-head construction.

Fig. 5 is a sectional view, taken substantially as indicated by the line 5—5 of Fig. 4.

Fig. 6 is a bottom plan view, with parts broken away, taken substantially as indicated by the arrow 6 of Fig. 4, but showing a pair of exhaust passages as more widely divergent than are those of Figs. 4 and 5, and showing additionally a part of an exhaust manifold, of special construction, adapted to cooperate with said passages.

Referring first to the form illustrated in Figs. 1, 2 and 3, it is herein assumed that the general relationship of parts will be obvious upon an inspection of said figures or upon reference to the mentioned patent,—any suitable cylinder block 10 being ordinarily provided with a plurality of cylinders 11, each of which is in communication with some intake port, not shown, and also with a passage 12,—the latter leading to an exhaust opening 13 controlled by a poppet valve having a stem 14 and a head 15, to engage a seat 16.

In the present construction, the opening 13 is shown as communicating with separate exhaust ports 16, 16' by a pair of passages 17, 17', divergent from said opening and from one another in the upper portions thereof but substantially parallel in their lower portions; but it should be understood that said lower portions may be either parallel, convergent or divergent, provided they are so spaced from a guide 18, for the valve stem 14, as to admit cooling water (delivered to a space 19 surrounding the cylinder 19 and separately surrounding the passages 17, 17') to substantially the entire length of said guide. That is to say, not only outer walls 20, 20' of the passages 17, 17' but inner walls 21, 21' of said passages are intended to be outwardly divergent in the region referred to, in order that guide 18, shown as cylindrical throughout substantially the length thereof, may be so separate from said passages as to expose said guide to cooling water and thereby to obviate conduction of the heat of exhaust gases through said walls to said guide. Fig. 1 diagrammatically suggests the admission of cooling water through an opening 22, from which it may circulate on all sides of the guide 18 and on all sides of the passages 17, 17' before finding exit into a head 23 through coincident openings 24, 24',—an insulating and lubricating bushing being suggested at 25 and a gasket at 26; but no effort is made to show an exact path of circulation of cooling water in connection with the alternative form illustrated in Figs. 4, 5 and 6,—to which mentioned characters are applied with the addition of an "a".

In Figs. 4 and 5, a head block 23a, provided with water passages 19a, is shown as including also an intake port 27a, controlled by a poppet valve 28a engaging a seat 29a; but the principles of the present invention are applied in these figures, only in connection with exhaust passages 17a, 17a',—shown as diverging from an opening 13a. This is controlled by a valve comprising a stem 14a and head 15a,—said passages being finally convergent toward ports 16a, 16a', and even the inner walls 21a, 21a' of said passages being initially divergent and spaced from a stem guide 18a in such manner as to permit full access of cooling water to a cylindrical or other exterior surface of said guide substantially throughout the length thereof.

Fig. 6, including few details as to the construction of a block 23b or a valve comprising a head 15b, will be seen to suggest a comparatively wide and continuous divergence of exhaust passages 17b, 17b', terminating in ports at 16b, 16b'; but it will be understood that the employment of a special manifold 30b, provided with separate branches 31b, 31b', spaced apart by a web or webs and/or by an opening 32b, may depend upon the distance, in a given instance, between separate exhaust ports 16b, 16b' and the importance that may be attached to a "stream-lining" effect.

Although the exact curvature given to any pair of initially divergent and continuously separate exhaust passages controlled by a single valve may, as indicated, be widely varied, it will be noted not only that all forms of the present invention contemplate some provision of a saddle-like bridge element such as is shown at 33 in Figs. 1 and 2 and at 33a in Figs. 5 and 6 (said bridge element preferably terminating in a sharp or rounded edge such as is shown at 34, or at 34a or at 34b,—extending transversely of a valve opening) but that the interconnection of passages 17, 17' with one another and with guide 18 (or the interconnection of passages 17a, 17a' with guide 18a; or the interconnection of passages 17b, 17b' with guide 18b) is in all cases mainly or exclusively effected by means of the bridge element; and that said bridge element is attached only at its ends, and is exempt from any distorting strains, by reason of its symmetry with reference to at least two planes extending through the axis thereof and intersecting at right angles to one another.

Although the foregoing descriptions have included complete details of but a limited number of embodiments of the present invention it is believed that the principles relied on and the mode of operation will be fully understood from said descriptions; and it should be understood, in connection therewith, not only that various features of the present invention might be independently employed but also that numerous modifications, additional to any suggested herein, might easily be devised by skilled workers, if informed of the foregoing,—all without departure from the scope of the present invention as the latter is indicated above and in the following claims.

What I claim is:

1. In an internal combustion engine: a block providing a space for cooling water and having an opening which provides a seat for an exhaust valve; and a plurality of divergent exhaust passages leading from said opening through said water space to separate outlet ports from said block.

2. In an internal combustion engine: a block providing a space for cooling water and having an opening which provides a seat for an exhaust valve having a stem; and a plurality of exhaust passages leading from said opening through said water space to separate outlet ports from said block, walls of said passages being divergent from said seat opening and spaced from said stem.

3. In an internal combustion engine: a block providing a space for cooling water and having an opening which provides a seat for an exhaust valve having a stem; a valve stem guide extending through said space; and a plurality of exhaust passages leading from said opening through said space,—inner walls of said passages being divergent from said seat opening and so spaced from said guide as to admit cooling water to substantially the entire length thereof.

4. In an internal combustion engine: a block providing a space for cooling water and having an opening which provides a seat for an exhaust valve having a stem; and a plurality of exhaust passages leading from said opening through said water space to separate outlet ports from said block,—inner walls of said passages being spaced from one another and a guide for said stem being disposed therebetween and out of contact therewith.

5. In an internal combustion engine: a block providing a space for cooling water and having an opening which provides a seat for an exhaust valve having a stem; and a plurality of exhaust passages leading from said opening through said water space to separate outlet ports from said block,—said stem being provided with a guide extending through said water space and so spaced from said passages as to expose said guide substantially throughout the length thereof to cooling water in said space.

6. In an internal combustion engine: a block providing a space for cooling water and having an opening which provides a seat for an exhaust valve having a stem; and a plurality of exhaust passages leading from said opening through said water space to separate outlet ports from said block,—said stem being provided with a guide extending through said water space and having the form of an exposed cylinder throughout substantially the entire length thereof.

7. In an internal combustion engine: a block providing a space for cooling water and having an opening which provides a seat for an exhaust valve having a stem; and a plurality of oppositely curved exhaust passages leading from said opening through said water space,—said stem being provided with a guide so extending through said water space between said passages as to expose both said guide and said passages to the cooling water throughout substantially the entire length thereof.

8. In an internal combustion engine: a block providing both a valved exhaust opening and a water space through which extends a valve stem guide; and a pair of exhaust passages divergent from said opening and spaced from said guide.

9. In an internal combustion engine: a block providing both a valved exhaust opening and a water space through which extends a valve stem guide; and a pair of exhaust passages divergent from said opening and leading to separate ports in said block.

10. In an internal combustion engine: a block providing both a valved exhaust opening and a water space through which extends a valve stem guide; a pair of exhaust passages divergent from said opening and leading to separate ports in said block; and a manifold, in engagement with said block, provided with correspondingly spaced openings.

11. In an internal combustion engine: a block providing both a valved exhaust opening and also a water chamber through which extends a valve stem guide; a bridge extending transversely of said opening and supporting one end of said guide; and a pair of exhaust passages divergent from said opening and also supported from said bridge.

ROBERT JARDINE.